US011753047B2

(12) United States Patent
Bielby

(10) Patent No.: US 11,753,047 B2
(45) Date of Patent: Sep. 12, 2023

(54) IMPAIRED DRIVER ASSISTANCE

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 221 days.

(21) Appl. No.: 16/915,976

(22) Filed: Jun. 29, 2020

(65) Prior Publication Data

US 2021/0403052 A1 Dec. 30, 2021

(51) Int. Cl.
*B60W 60/00* (2020.01)
*B60W 40/08* (2012.01)
*G06N 20/00* (2019.01)
*G06N 5/04* (2023.01)
*G01S 19/42* (2010.01)

(52) U.S. Cl.
CPC ........ *B60W 60/0059* (2020.02); *B60W 40/08* (2013.01); *B60W 60/0016* (2020.02); *B60W 60/0018* (2020.02); *B60W 60/0025* (2020.02); *B60W 60/0051* (2020.02); *G01S 19/42* (2013.01); *G06N 5/04* (2013.01); *G06N 20/00* (2019.01); *B60W 2040/0836* (2013.01); *B60W 2420/42* (2013.01); *B60W 2540/26* (2013.01)

(58) Field of Classification Search
None
See application file for complete search history.

(56) References Cited

U.S. PATENT DOCUMENTS

| 10,004,431 | B2* | 6/2018 | Shuster | A61B 5/112 |
| 10,322,728 | B1* | 6/2019 | Porikli | G06K 9/6274 |
| 10,471,969 | B1* | 11/2019 | Laserra Lima | G05D 1/0061 |
| 11,059,492 | B2* | 7/2021 | Govindjee | B60W 40/09 |
| 2014/0310788 | A1 | 10/2014 | Ricci | |
| 2016/0318521 | A1* | 11/2016 | Nothacker | G01N 33/4972 |
| 2021/0403017 | A1 | 12/2021 | Bielby | |
| 2021/0403019 | A1* | 12/2021 | Kim | H04W 4/38 |

FOREIGN PATENT DOCUMENTS

WO WO-2020081576 A1 * 4/2020 ......... G01C 21/3423

OTHER PUBLICATIONS

Alexandre Gonfalonieri "How to Build A Data Set For Your Machine Learning Project" Feb. 13, 2019. Towards Data Science. (Year: 2019).*

* cited by examiner

*Primary Examiner* — Shon G Foley
(74) *Attorney, Agent, or Firm* — Greenberg Traurig

(57) ABSTRACT

A system in a vehicle can have a camera and/or a sensor. Such a camera can be configured to record a visual feature of a user in the vehicle and send data derived from the visual feature. Such a sensor can be configured to sense a non-visual feature of the user in the vehicle and send data derived from the non-visual feature. The system can have a computing system configured to receive such data from the camera and the sensor. The computing device can also be configured to determine a state of the user based on the received data derived from visual and non-visual features, as well as an AI system. The computing device can also be configured to enable or disable a function of the vehicle based at least partially on the state of the user, which the AI system can infer from the received data.

18 Claims, 6 Drawing Sheets

IMPAIRED DRIVER ASSISTANCE

FIELD OF THE TECHNOLOGY

At least some embodiments disclosed herein relate to impaired driver assistance.

BACKGROUND

Systems of transportation are evolving, and within the last thirty years there has been dramatic changes in the way people get from point A to B. For example, advanced driver-assistance systems (ADAS) are electronic systems that help a driver of a vehicle while driving. ADAS provide for increased car safety and road safety. ADAS systems use electronic technology, such as electronic control units and power semiconductor devices. Most road accidents occur due to human error; thus, ADAS, which automates some control of the vehicle, can reduce human error and road accidents. ADAS have been designed to automate, adapt and enhance vehicle systems for safety and improved driving. Safety features of ADAS are designed to avoid collisions and accidents by offering technologies that alert the driver to potential problems, or to avoid collisions by implementing safeguards and taking over control of the vehicle. Adaptive features may automate lighting, provide adaptive cruise control and collision avoidance, provide pedestrian crash avoidance mitigation (PCAM), alert driver to other cars or dangers, provide a lane departure warning system, provide automatic lane centering, show field of view in blind spots, or connect to navigation systems.

As another example, ridesharing has changed the way people get around town. And, it has provided many drivers with alternative opportunities. Ridesharing has become a pervasive mode of transportation in the United States and is growing throughout the world. A ridesharing service connects passengers with drivers or vehicles via a website or another type of application. Currently, several ridesharing services match customers and vehicles via mobile apps. Ridesharing services for automobiles can be referred to as ride-hailing services, and such services also are available for ridesharing with other types of vehicles including aircraft and watercraft.

Ridesharing services have become prevalent in less populated or poorer areas that are not regularly served by taxicabs. Also, ridesharing has become widespread because there is at least a perception that such services are less expensive than taxicab services. Also, ridesharing is beneficial because it has been shown to reduce drunk driving rates in some cities where such services operate.

BRIEF DESCRIPTION OF THE DRAWINGS

The present disclosure will be understood more fully from the detailed description given below and from the accompanying drawings of various embodiments of the disclosure.

DETAILED DESCRIPTION

At least some embodiments disclosed herein relate to impaired driver assistance. For example, based on the current level of mental capacity of a driver evaluated via an artificial intelligence (AI), a vehicle can selectively give control to or take control from the driver. For instance, the vehicle can enable an autonomous driving mode, disable driving of the vehicle, order a rideshare for the driver, or determine a destination from an inference made based on a pattern of trips made using the vehicle, the current location, and the current time. These are some of the many actions the vehicle can take based on the mental capacity or determined impairment of a driver or a potential driver.

In other words, an AI system such as a system including one or more artificial neural network (ANN), decision tree, etc. can determine mental capacity or state of a driver. Also, the AI system or a second AI system can determine an action based on the determined mental capacity or state of a driver. The determined action can include selectively taking control from the driver by enabling an autonomous driving mode, disable driving of the vehicle, order a rideshare for the driver, and/or determining a destination from an inference made based on a pattern of trips made using the vehicle, the current location, the current time, just to name a few examples.

Some embodiments can include a system in a vehicle that can have a camera and/or a sensor. A camera of the system can be configured to record a visual feature of a user in the vehicle and send data derived from the visual feature. A sensor of the system can be configured to sense a non-visual feature of the user in the vehicle and send data derived from the non-visual feature. The system can also have a computing system configured to receive data from the camera and/or the sensor. The computing device can also be configured to determine a state of the user based on such received data, as well as an AI system. The computing device can also be configured to enable or disable a function of the vehicle based at least partially on the state of the user.

Figure 1:
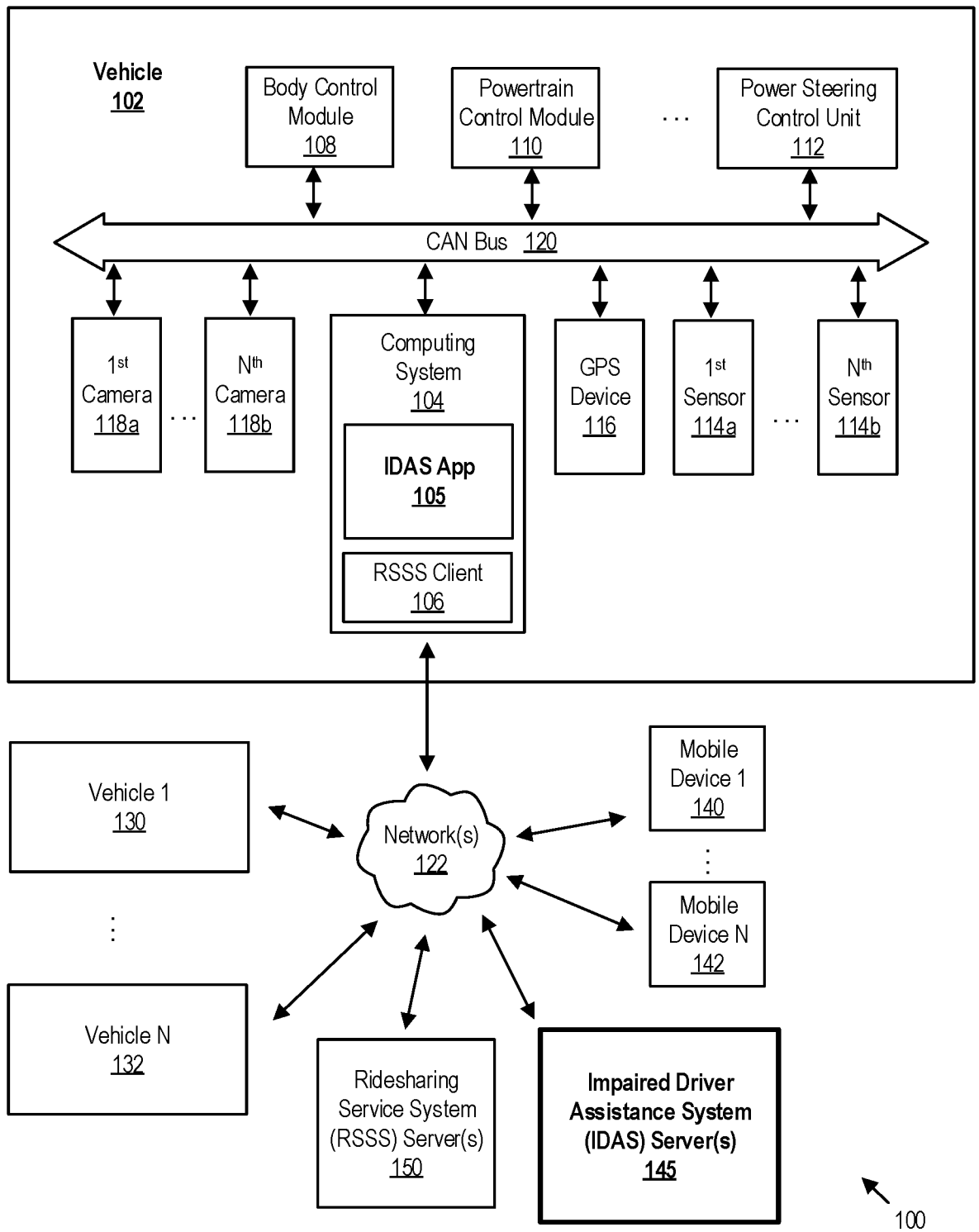
FIGS. 1 to 3 illustrate an example networked system that includes at least vehicles, mobile devices, a ridesharing service system (RSSS), and an impaired driver assistance system (IDAS) and that is configured to implement aspects of impaired driver assistance, in accordance with some embodiments of the present disclosure.
Figure 2:
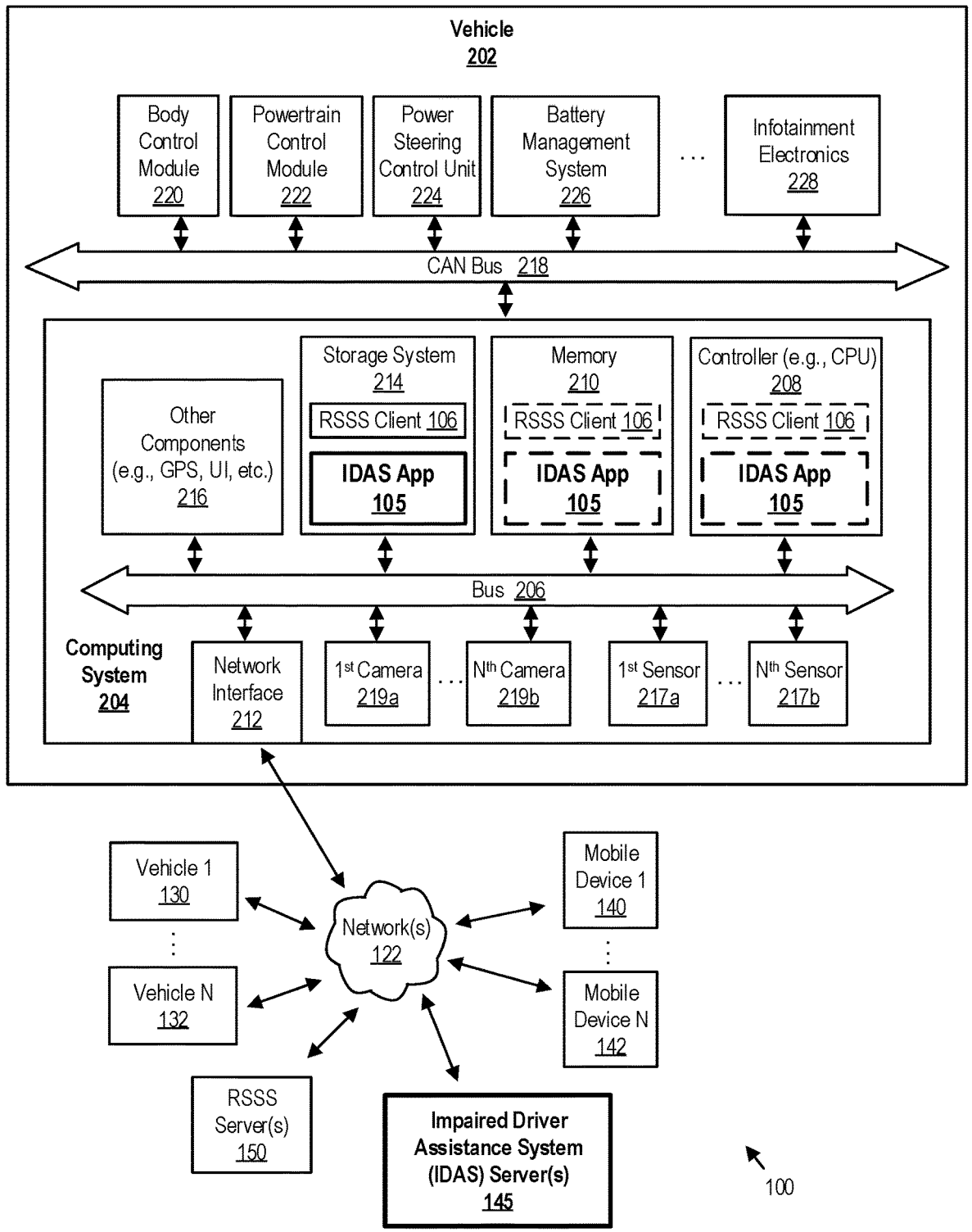
Figure 3:
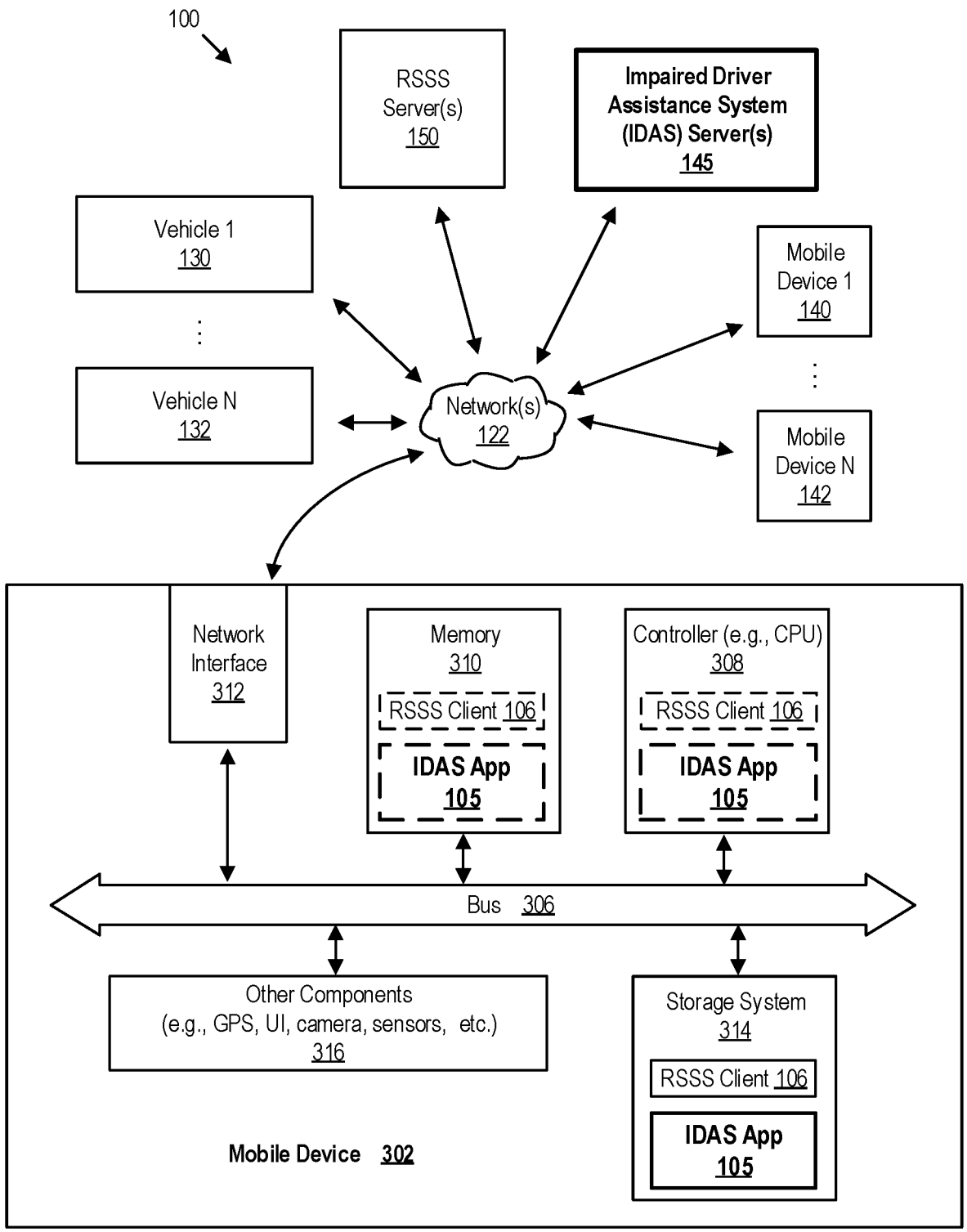

FIGS. 1 to 3 illustrate an example networked system that includes at least vehicles (e.g., see vehicles 102, 202, and 130 to 132), mobile devices (e.g., see mobile devices 140 to 142 and 302), a ridesharing service system (RSSS), and an impaired driver assistance system (IDAS) and that is configured to implement aspects of impaired driver assistance, in accordance with some embodiments of the present disclosure. Any one or more of the vehicles 102, 202, and 130 to 132 can be the vehicle 410 shown in FIG. 4 or include at least some of the parts of the vehicle 410.

The networked system 100 is networked via one or more communications networks 122. Communication networks described herein, such as communications network(s) 122, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see mobile devices 140, 142, and 302, vehicles 102, 130, 132, and 202, one or more RSSS servers 150, and one or more IDAS servers 145) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see vehicle computing systems 104 and 204). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 1, the networked system 100 can include at least a vehicle 102 that includes a vehicle computing system 104 (including a client application 106 of the RSSS—also referred to herein as the RSSS client 106—as well as a client application 105 of the IDAS—also referred to herein as the IDAS app 105), a body and controllable parts of the body (not depicted), a powertrain and controllable parts of the powertrain (not depicted), a body control module 108 (which is a type of electronic control unit or ECU), a powertrain control module 110 (which is a type of ECU), and a power steering control unit 112 (which is a type of ECU). The vehicle 102 also includes a plurality of sensors (e.g., see sensors 114a to 114b—which can include sensors), a GPS device 116, a plurality of cameras (e.g., see cameras 118a to 118b—which can include camera 416 shown in FIG. 4), and a controller area network (CAN) bus 120 that connects at least the vehicle computing system 104, the body control module 108, the powertrain control module 110, the power steering control unit 112, the plurality of sensors, and the plurality of cameras to each other. Also, as shown, the vehicle 102 is connected to the network(s) 122 via the vehicle computing system 104. Also, as shown, vehicles 130 to 132 and mobile devices 140 to 142 are connected to the network(s) 122, and thus, are communicatively coupled to the vehicle 102.

The IDAS app 105 included in the vehicle computing system 104 can communicate with the IDAS server(s) 145. The IDAS app 105 can be or include an IDAS client specifically configured for use by a user or driver of the vehicle 102 or any other vehicle described herein. Such a user or driver can be a user or a customer of a driver assistance service provided by the IDAS which is provided via the IDAS app 105 and the IDAS server(s) 145.

The RSSS client 106 included in the vehicle computing system 104 can communicate with the RSSS server(s) 150. The RSSS client 106 can be or include an RSSS client specifically configured for use by a user or driver of the vehicle 102 or any other vehicle described herein. Such a user or driver can be a user or a customer of a ridesharing service provided by the RSSS which is provided via the RSSS client 106 and the RSSS server(s) 150.

In some embodiments, the vehicle 102 can include a body, a powertrain, and a chassis, as well as at least one camera and at least one sensor (e.g., see cameras 118a to 118b and sensors 114a to 114b). The at least one camera and at least one sensor can each be attached to at least one of the body, the powertrain, or the chassis, or any combination thereof. For example, the camera(s) or sensor(s) can be embedded in or attached to a ceiling of the body of the vehicle 102, a sidewall of a cabin of the body, a door of the body, a front part of the cabin of the body, or a back part of the cabin of the body (such as in or near a back seat of the cabin). The camera(s) or sensor(s) can be configured to face inwards into the cabin of the vehicle 102 and to capture, sense, or record a field of view that covers up to a semi-circle or a full circle in a horizontal plane relative to the vehicle to capture at least one image or non-visual information of a driver within the cabin of the vehicle.

In such embodiments and others, the vehicle 102 includes at least one camera (e.g., see cameras 118a to 118b) configured to record at least one image of a driver in the vehicle and/or includes at least one sensor (e.g., see sensors 114a to 114b) configured to sense at least one non-visual feature of the driver. The recording by the at least one camera and/or the sensing by the at least one sensor can occur during a predetermined time period. And, the at least one camera can be configured to generate and send image data derived from the at least one image of the driver, and the at least one sensor can be configured to generate and send non-visual data derived from the at least one non-visual feature of the driver. The recording of the at least one image and/or the sensing of the at least one non-visual feature can occur in response to the user or driver entering the vehicle 102 or another action by the user or driver that typically leads to driving of the vehicle.

In such embodiments and others, a system in the vehicle 102 or in any other vehicle described herein can include at least one camera (e.g., see cameras 118a to 118b) configured to record at least one visual feature of a user in the vehicle, and send visual data derived from the at least one visual feature. The system can also include a computing system or device (e.g., see computing system 104 and mobile devices 140 to 142) configured to receive, such as via the IDAS app 105, the visual data from the at least one camera, and determine, such as via the IDAS app, at least one state of the user based on the received visual data and an AI system. The IDAS app 105 can include at least part of the AI system. Also, the computing system or device can be configured to enable, such as via the IDAS app 105, at least one function of the vehicle based on the determined at least one state of the user. The computing system or device can also be configured to disable, such as via the IDAS app 105, at least one function of the vehicle based on the determined at least one state of the user. The computing system or device can also be configured to automatically request, such as via the RSSS client 106, a ride from a ridesharing service or similar party based on the determined at least one state of the user.

In such embodiments and others, the enabling or disabling of at least one function of the vehicle (e.g., vehicle 102) is based on a second AI system. And, input for the second AI system can include the at least one determined state of the user. The AI system can include at least one of an ANN, or a decision tree, or any combination thereof, and the second AI system can include at least one of an ANN, a decision tree, or any combination thereof. Any AI system or technique described herein can include an ANN, a decision tree, or another type of AI tool, or any combination thereof. Received image data described herein or a derivative thereof and any received non-visual data described herein or a derivative thereof can be input for the AI system or technique in general or specifically for one or more of the aforesaid AI tools.

In such embodiments and others, a function of the at least one function of the vehicle (e.g., vehicle 102) includes at least one part of the vehicle selectively taking control of the drivetrain from the user by enabling an autonomous driving mode. This can occur via the computing system 104 and/or the powertrain control module 110. In such examples, the computing system or device can be configured to enable the autonomous driving mode of the vehicle based on the determined at least one state of the user including an impaired driver state.

In such embodiments and others, a function of the at least one function of the vehicle (e.g., vehicle 102) includes at least one part of the vehicle selectively disabling the drivetrain prior to driving of the vehicle from a parked state. This can occur via the computing system 104 and/or the powertrain control module 110. In such examples, the computing system can be configured to disable the drivetrain prior to driving of the vehicle from a parked state based on the determined at least one state of the user including an impaired driver state.

In such embodiments and others, a function of the at least one function of the vehicle (e.g., vehicle 102) includes at least one part of the vehicle selectively ordering a rideshare for the user. This can occur via the computing system 104, the IDAS app 105, and/or the RSSS client 106. In such examples, the computing system can be configured to selectively order the rideshare for the user based on the determined at least one state of the user including an impaired driver state. The selective ordering of the rideshare can include determining a destination for the user for the rideshare from an inference made based on a pattern of trips made using the vehicle, the current location (which can be determined at least based on input from a GPS device, e.g., GPS device 116), and the current time. Also, in some embodiments, the determining of the destination can also based on a second AI system including at least one of an ANN, or a decision tree, or any combination thereof. Input for the second AI can include the pattern of trips.

In such embodiments and others, the system or device can include at least one sensor (e.g., see sensors 114a and 114b) configured to record at least one non-visual feature of a user in the vehicle (e.g., vehicle 102), and send non-visual data derived from the at least one non-visual feature. In such examples, the computing system or device can be configured to receive the visual and non-visual data, and determine at least one state of the user based on the received visual and/or non-visual data and the AI system. And, the computing system or device can be configured to enable or disable at least one function of the vehicle based on the determined at least one state of the user.

In general, an AI system may be trained using a supervised method where the parameters in the AI system are adjusted to minimize or reduce the error between known outputs resulted from respective inputs and computed outputs generated from applying the inputs to the AI system. Examples of supervised learning/training methods include reinforcement learning, and learning with error correction.

Alternatively, or in combination, an AI system may be trained using an unsupervised method where the exact outputs resulting from a given set of inputs are not known before the completion of training. The AI system can be trained to classify an item into a plurality of categories, or data points into clusters. Multiple training algorithms can be employed for a sophisticated machine learning/training paradigm.

In one example, an AI system may be configured as an ANN, a convolutional neural network (CNN), or a decision tree that is trained using reinforcement learning. For example, the AI system may gather visual data (e.g., image data such as still images or video) and non-visual data (e.g., voice recordings, blood alcohol content (from a breathalyzer), body temperature, etc.) and other sensor data for sample drivers approaching the vehicle or in the vehicle and store the data in a database during a training period. The AI system learns and reinforces patterns (e.g., behavioral patterns—posture, gait, speech, etc.) and other characteristics (e.g., body temperature, blood alcohol content, etc.) for impaired and non-impaired drivers during the training period. After the initial training period the AI system learns and reinforces the training with characteristics (e.g., behavior and biometric characteristics) of other drivers.

In one example, the computing system is configured to train the AI system using supervised learning. The input for the supervised learning of the AI system can include image data and non-visual data of sample drivers and determined at least one state of the sample drivers that was based on the image data and non-visual data.

In such embodiments and others, a system in the vehicle 102 or in any other vehicle described herein can include at least one camera (e.g., see cameras 118a to 118b) configured to record at least one visual feature of a user in the vehicle. The vehicle can have a plurality of first features in operating the vehicle and a second feature in operating the vehicle. The at least one camera can also be configured to send visual data derived from the at least one visual feature. The system can also include a computing system (e.g., computing system 104 or one of the depicted mobile devices) configured to receive the visual data from the at least one camera, and determine at least one state of the user based on the received visual data and an AI system. The computing system can also be configured to determine, based on the at least one state of the user, to enable the second feature for the user. And, the computing system can be configured to enable the second feature according to the determination to enable the second feature. The computing system can also be configured to determine, based on the at least one state of the user, to disable the second feature for the user. And, the computing system can be configured to disable the second feature according to the determination to disable the second feature.

In such embodiments and others, the second feature can include at least one part of the vehicle selectively taking control of the drivetrain from the user by enabling an autonomous driving mode. Also, the second feature can include at least one part of the vehicle selectively disabling the drivetrain prior to driving of the vehicle from a parked state. Also, the second feature can include at least one part of the vehicle selectively ordering a rideshare for the user. The selective ordering of the rideshare can include determining a destination for the user for the rideshare from an inference made based on a pattern of trips made using the vehicle, the current location, and the current time. The determining the destination can also be based on a second AI system including at least one of an ANN, or a decision tree, or any combination thereof. And, input for the second AI can include the pattern of trips.

In such embodiments and others, the AI system and/or the second AI system can include at least one of an ANN, or a decision tree, or any combination thereof. Any AI system or technique described herein can include an ANN, a decision tree, or another type of AI tool, or any combination thereof. Received image data described herein or a derivative thereof and any received non-visual data described herein or a derivative thereof can be input for the AI system or technique in general or specifically for one or more of the aforesaid AI tools.

In such embodiments and others, at least one sensor (e.g., sensors 114a to 114b) can be configured to sense at least one non-visual feature of the user in the vehicle, and send non-visual data derived from the at least one visual feature. The computing system in such examples can be configured to receive the visual and non-visual data, and determine at least one state of the user based on the received visual and non-visual data and the AI system. The computing system can also be configured to determine, based on the at least one state of the user, to enable or to disable the second feature for the user. The computing system can also be configured to enable or disable the second feature according to the determination to enable the second feature.

In such embodiments and others, the at least one sensor (e.g., see sensors 114a to 114b) can include a breathalyzer configured to sense blood alcohol content of the driver during the time period, and the at least one sensor can be configured to send data derived from the sensed blood alcohol content as at least part of the non-visual data. In such embodiments and others, the at least one sensor (e.g., see sensors 114a to 114b) can include a thermometer configured to sense a body temperature of the driver during the time period, and the at least one sensor can be configured to send data derived from the sensed body temperature as at least part of the non-visual data. In such embodiments and others, the at least one sensor (e.g., see sensors 114a to 114b) can include a microphone configured to transform sound from speech of the driver during the time period into an audio signal, and the at least one sensor can be configured to send data derived from the audio signal as at least part of the non-visual data.

In some embodiments, the received image data sent from the at least one camera (e.g., see cameras 118a to 118b) can include information on a posture of the driver. And, in such embodiments and others, the received image data sent from the at least one camera can include information on facial characteristics of the driver.

In some embodiments, the received data received from the camera(s) and/or the sensor(s) (e.g., see cameras 118a to 118b and sensors 114a to 114b) can include information on a gait of a driver approaching the vehicle 102 before driving the vehicle, information of a posture of the driver while approaching the vehicle or while in the vehicle, or information on facial characteristics of the driver, or any combination thereof. The received data can also include information on blood alcohol content of the driver, a body temperature of the driver, or speech of the driver, or any combination thereof.

In such embodiments and others, the vehicle 102 can include a vehicle computing system (e.g., vehicle computing system 104) configured to receive the image data from the at least one camera (e.g., see cameras 118a to 118b) and/or the non-visual data from the at least one sensor (e.g., see sensors 114a to 114b). The vehicle computing system can also be configured to determine, such as via the IDAS app 105, a risk score of the driver based on the received image data and/or the received non-visual data. The vehicle computing system can also be configured to determine, such as via the IDAS app 105, a risk score of the driver for the predetermined time period based on the received image data and/or the received non-visual data. The risk score can also be determined based on an AI technique. The AI technique can include an ANN, a decision tree, or another type of AI tool, or any combination thereof. The received image data or a derivative thereof and the received non-visual data or derivative thereof can be input for the AI technique in general or specifically for one or more of the aforesaid AI tools. For example, the received data or a derivative thereof can be input for an ANN.

The vehicle computing system (e.g., vehicle computing system 104) can also be configured to transmit the risk score of the driver to the driver, via a UI, so that the driver can decide whether to drive or not, and as an alternative to driving decide whether to book a vehicle for a ride through a ridesharing service via the RSSS client 106. The transmission of the risk score can be to a mobile device of the driver or a user in the vehicle (e.g., see mobile devices 140 to 142 and mobile device 302) or to a UI of a computing system of the vehicle. Also, the vehicle computing system can be configured to determine, such as via the IDAS app 105, whether to notify a user in the vehicle 102 or the driver of the vehicle of the risk score based on the risk score exceeding a risk threshold. And, only if the score exceeds the threshold is the user or driver notified in such embodiments. The mobile devices described herein (e.g., see mobile devices 140 to 142 and mobile device 302) can include a user interface (e.g., see other components 316 of the mobile device 302 shown in FIG. 3), configured to output, such as via the IDAS app 105, the risk score. The user interface of a mobile device can be configured to provide, such as via the IDAS app 105, a graphical user interface (GUI), a tactile user interface, or an auditory user interface, or any combination thereof. Also, embodiments described herein can include one or more user interfaces of any type, including tactile UI (touch), visual UI (sight), auditory UI (sound), olfactory UI (smell), equilibria UI (balance), and gustatory UI (taste).

In some embodiments, the vehicle computing system 104 of the vehicle 102 is configured to train the AI technique using supervised learning. The input for the supervised learning of the AI technique can include image data of images of sample drivers and risk scores determined by users and/or developers for the images of the sample drivers. The input for the supervised learning of the ANN can also include non-visual information of the sample drivers and risk scores determined by users and/or developers for the non-visual information of the sample drivers.

In some embodiments, the vehicle computing system 104 of the vehicle 102 is configured to determine, such as via the IDAS app 105, biographical information of the driver of the vehicle based on at least the received data and/or a database of (such as a database of the IDAS and/or one or more jurisdictions in which the driver is licensed to drive). The database can store biographical information on registered and licensed drivers. And, the stored biographical information can include characteristics of the registered drivers as well as at least one of criminal histories of the registered drivers, driving behavior histories of the registered drivers, or service or traffic violation histories of the registered drivers, or any combination thereof. In such embodiments and others, the vehicle computing system 104 of the vehicle 102 can be configured to determine the risk score of the driver based on the received data, the AI technique, and the determined biographical information of the driver. The input for the AI technique can include the data or a derivative thereof and/or the determined biographical information or a derivative thereof.

Figure 4:
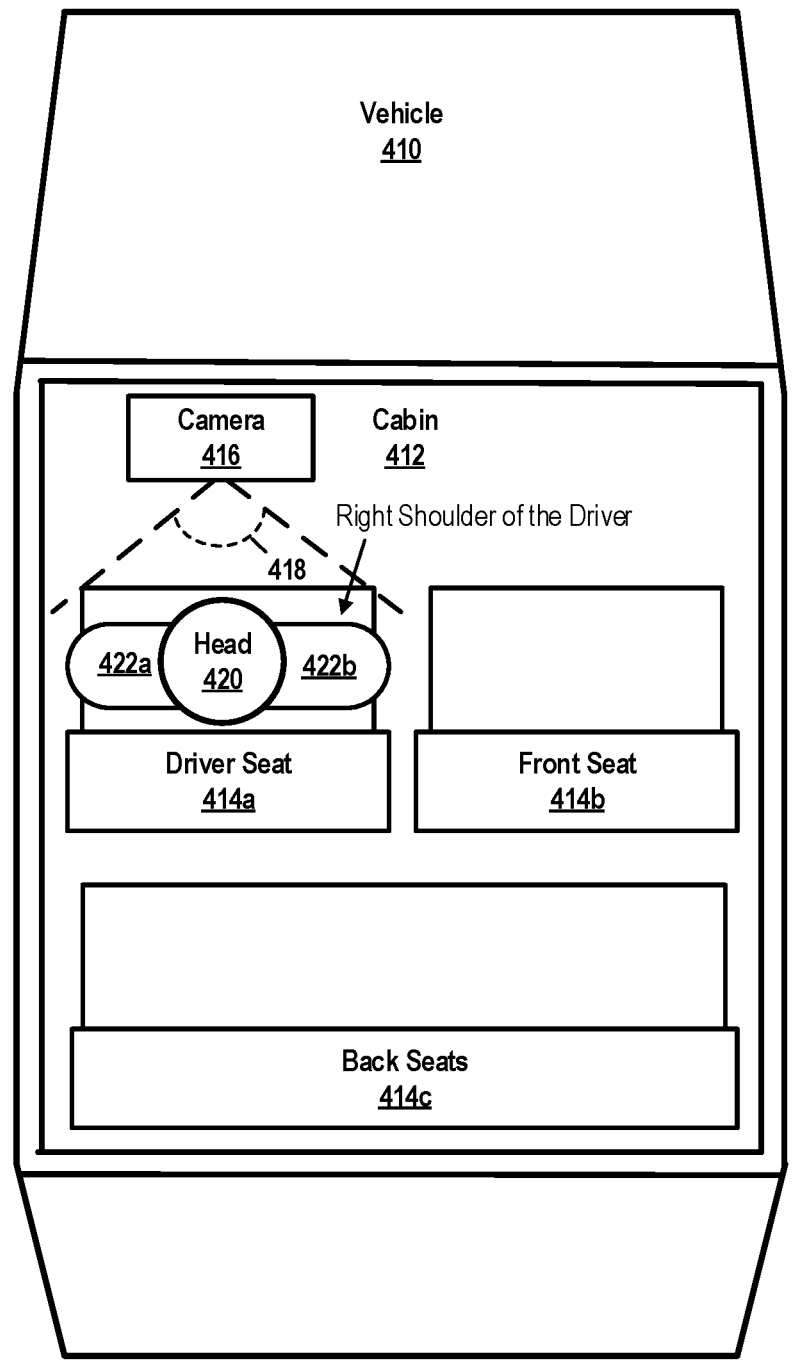
FIG. 4 illustrates a diagram of an example vehicle configured to implement aspects of impaired driver assistance, in accordance with some embodiments of the present disclosure.

Not depicted in FIG. 1, but depicted in FIG. 4, the vehicle 102 can include a camera that faces inwards into the cabin of the vehicle in one or more directions to have a field of view that covers at least a semicircle in a horizontal plane relative to the vehicle (e.g., see camera 16 and cameras 118a to 118b). And, the camera(s) can include the at least one camera configured to record the at least one image of the driver and to generate and send data derived from the at least one image of the driver. In some embodiments, the camera(s) can have a field of view that covers at least a full circle in the horizontal plane to record at least one image of the driver in the vehicle 102 from any direction in the horizontal plane.

In some embodiments, the vehicle computing system 104 (such as via the IDAS app 105 and/or the RSSS client 106) can be configured to receive and process data (e.g., such as data including instructional data for the vehicle and its systems and/or data related to information of the driver and/or biographical information of the driver). The received data can be processed for inclusion in other processing steps described herein. The received data can include information derived from at least linked risk score data, image data, sensed non-visual data, temporal data, position data, or other contextual data sent from the vehicle 102 or other vehicles (e.g., see vehicles 130 to 132) regarding the driver. In some embodiments, the derivation of the received data and/or the later processing of the received data can be according to an AI technique, and the AI technique can be trained by a computing system of the IDAS and/or the RSSS, the vehicle 102, or a mobile device of the driver or another user (e.g., see mobile devices 140 to 142). In such embodiments and others, the mobile devices of the driver or user can include a user interface (such as a graphical user interface) configured to provide at least part of the received and processed data to the driver or user (e.g., see other components 316 of mobile device 302 depicted in FIG. 3, which can include a GUI).

The vehicle 102 includes vehicle electronics, including at least electronics for the controllable parts of the body, the controllable parts of the powertrain, and the controllable parts of the power steering. The vehicle 102 includes the controllable parts of the body and such parts and subsystems being connected to the body control module 108. The body includes at least a frame to support the powertrain. A chassis of the vehicle can be attached to the frame of the vehicle. The body can also include an interior for at least one driver or passenger. The interior can include seats. The controllable parts of the body can also include one or more power doors and/or one or more power windows. The body can also include any other known parts of a vehicle body. And, the controllable parts of the body can also include a convertible top, sunroof, power seats, and/or any other type of controllable part of a body of a vehicle. The body control module 108 can control the controllable parts of the body. Also, the vehicle 102 also includes the controllable parts of the powertrain. The controllable parts of the powertrain and its parts and subsystems are connected to the powertrain control module 110. The controllable parts of the powertrain can include at least an engine, transmission, drive shafts, suspension and steering systems, and powertrain electrical systems. The powertrain can also include any other known parts of a vehicle powertrain and the controllable parts of the powertrain can include any other known controllable parts of a powertrain. Also, power steering parts that are controllable can be controlled via the power steering control unit 112.

The plurality of sensors (e.g., see sensors 114a to 114b) and/or the plurality of cameras (e.g., see cameras 118a to 118b) of the vehicle 102 can include any type of sensor or camera respectively configured to sense and/or record one or more features or characteristics of a driver within the cabin of the vehicle 102 (e.g., see cabin 12) or of the surroundings of the vehicle 102, such as when the driver is approaching the vehicle in the vehicle's surroundings. A sensor or a camera of the vehicle 102 can also be configured to output the generated data corresponding to the one or more features or characteristics of the driver. Any one of the plurality of sensors or cameras can also be configured to send, such as via the CAN bus 120, the generated data corresponding to the one or more features or characteristics of the driver to the vehicle computing system 104 or other electronic circuitry of the vehicle 102. The sending of the data to other electronic circuitry of the vehicle 102 can be useful when a driver is drunk, tired, sick, or inhibited from driving well in another way. For example, the data or a derivative thereof can be sent to the body control module 108 to lock or position the driver seat to hint to the driver that he or she should not be driving, the powertrain control module 110 to prevent the engine from being turned on, and/or the power steering control unit 112 to lock the wheels in a direction moving towards a parked position of the vehicle, in response to a driver that is drunk, tired, sick, or inhibited from driving well in another way. In other embodiments, alternatives to the CAN bus for sending generated or other data may include, for example, FLEXRAY, Ethernet, and/or time-triggered buses.

A set of mechanical components for controlling the driving of the vehicle 102 can include: (1) a brake mechanism on wheels of the vehicle (for stopping the spinning of the wheels), (2) a throttle mechanism on an engine or motor of the vehicle (for regulation of how much gas goes into the engine, or how much electrical current goes into the motor), which determines how fast a driving shaft can spin and thus how fast the vehicle can run, and (3) a steering mechanism for the direction of front wheels of the vehicle (for example, so the vehicle goes in the direction of where the wheels are pointing to). These mechanisms can control the braking (or deacceleration), acceleration (or throttling), and steering of the vehicle 102. The driver can indirectly control these mechanisms by UI elements (e.g., see other components 216 of vehicle 202 shown in FIG. 2) that can be operated upon by the user, which are typically the brake pedal, the acceleration pedal, and the steering wheel. The pedals and the steering wheel are not necessarily mechanically connected to the driving mechanisms for braking, acceleration and steering. Such parts can have or be proximate to sensors that measure how much the driver has pressed on the pedals and/or turned the steering wheel. The sensed control input is transmitted to the control units over wires (and thus can be drive-by-wire). Such control units can include body control module 108 or 220, powertrain control module 110 or 222, power steering control unit 112 or 224, battery management system 226, etc. Such output can also be sensed and/or recorded by the sensors and cameras described herein as well (e.g., see sensors 114a to 114b or 217a to 217b and cameras 118a to 118b or 219a to 219b). And, the output of the sensors and cameras can be further processed then reported to server(s) (such as the IDAS server(s) 145) for cumulative data processing of contextual data related to the driver of the vehicle and other drivers.

In a vehicle, such as vehicle 102 or 202, a driver can control the vehicle via physical control elements (e.g., steering wheel, brake pedal, gas pedal, paddle gear shifter, etc.) that interface drive components via mechanical linkages and some electromechanical linkages. However, more and more vehicles currently have the control elements interface the mechanical powertrain elements (e.g., brake system, steering mechanisms, drive train, etc.) via electronic control elements or modules (e.g., electronic control units or ECUs). The electronic control elements or modules can be a part of drive-by-wire technology. Drive-by-wire technology can include electrical or electromechanical systems for performing vehicle functions traditionally achieved by mechanical linkages. The technology can replace the traditional mechanical control systems with electronic control systems using electromechanical actuators and human-machine interfaces such as pedal and steering feel emulators. Components such as the steering column, intermediate shafts, pumps, hoses, belts, coolers and vacuum servos and master cylinders can be eliminated from the vehicle. There are varying degrees and types of drive-by-wire technology. Vehicles, such as vehicles 102 and 202, having drive-by-wire technology can include a modulator (such as a modulator including or being a part of an ECU and/or an advance driver assistance system or ADAS) that receives input from a user or driver (such as via more conventional controls or via drive-by-wire controls or some combination thereof). The modulator can then use the input of the driver to modulate the input or transform it to match input of a "safe driver".

In some embodiments, the electronic circuitry of a vehicle (e.g., see vehicles 102 and 202), which can include or be a part of the computing system of the vehicle, can include at least one of engine electronics, transmission electronics, chassis electronics, driver or passenger environment and comfort electronics, in-vehicle entertainment electronics, in-vehicle safety electronics, or navigation system electronics, or any combination thereof (e.g., see body control modules 108 and 220, powertrain control modules 110 and 222, power steering control units 112 and 224, battery management system 226, and infotainment electronics 228 shown in FIGS. 1 and 2 respectively). In some embodiments, the electronic circuitry of the vehicle can include electronics for an automated driving system.

As shown in FIG. 2, the networked system 100 can include at least vehicles 130 to 132 and vehicle 202 which includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The vehicle computing system 204, which can have similar structure and/or functionality as the vehicle computing system 104, can be connected to communications network(s) 122 that can include at least a local to device network such as Bluetooth or the like, a wide area network (WAN), a local area network (LAN), an intranet, a mobile wireless network such as 4G or 5G, an extranet, the Internet, and/or any combination thereof. The vehicle computing system 204 can be a machine capable of executing a set of instructions (sequential or otherwise) that specify actions to be taken by that machine. Also, while a single machine is illustrated for the vehicle computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see data storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the vehicle computing system 204 that can include and implement the RSSS client 106 as well as the IDAS app 105. The vehicle computing system 204 can be communicatively coupled to the network(s) 122 as shown. The vehicle computing system 204 includes at least a bus 206, a controller 208 (such as a CPU) that can execute instructions of the IDAS app 105 and the RSSS client 106, memory 210 that can hold the instructions of the IDAS app 105 and the RSSS client 106 for execution, a network interface 212, a data storage system 214 that can store instructions for the IDAS app 105 and the RSSS client 106, and other components 216—which can be any type of components found in mobile or computing devices such as GPS components, I/O components such as a camera and various types of user interface components (which can include one or more of the plurality of UI elements described herein) and sensors (which can include one or more of the plurality of sensors described herein). The other components 216 can include one or more user interfaces (e.g., GUIs, auditory user interfaces, tactile user interfaces, car controls, etc.), displays, different types of sensors, tactile, audio and/or visual input/output devices, additional application-specific memory, one or more additional controllers (e.g., GPU), or any combination thereof. The vehicle computing system 204 can also include sensor and camera interfaces that are configured to interface sensors and cameras of the vehicle 202 which can be one or more of any of the sensors or cameras described herein (e.g., see sensors 217a to 217b and cameras 219a to 219b). The bus 206 communicatively couples the controller 208, the memory 210, the network interface 212, the data storage system 214, the other components 216, and the sensors and cameras as well as sensor and camera interfaces in some embodiments. The vehicle computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 214, which communicate with each other via bus 206 (which can include multiple buses).

In some embodiments, the vehicle computing system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 122). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 122).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a CAN bus 218 that connects at least the vehicle computing system 204, the vehicle body control module, the powertrain control module, the power steering control unit, the battery management system, and the infotainment electronics. Also, as shown, the vehicle 202 is connected to the network(s) 122 via the vehicle computing system 204. Also, shown, vehicles 130 to 132 and mobile devices 140 to 142 are connected to the network(s) 122, and thus, are communicatively coupled to the vehicle 202.

The vehicle 202 is also shown having the plurality of sensors (e.g., see sensors 217a to 217b) and the plurality of cameras (e.g., see cameras 219a to 219b), which can be part of the vehicle computing system 204. In some embodiments, the CAN bus 218 can connect the plurality of sensors and the plurality of cameras, the vehicle computing system 204, the vehicle body control module, the powertrain control module, the power steering control unit, the battery management system, and the infotainment electronics to at least the vehicle computing system 204. The plurality of sensors and the plurality of cameras can be connected to the vehicle computing system 204 via sensor and camera interfaces of the computing system.

As shown in FIG. 3, the networked system 100 can include at least a mobile device 302 as well as mobile devices 140 to 142. The mobile device 302, which can have somewhat similar structure and/or functionality as the vehicle computing system 104 or 204, can be connected to communications network(s) 122. And, thus, be connected to vehicles 102, 202, and 130 to 132 as well as mobile devices 140 to 142. The mobile device 302 (or mobile device 140 or 142) can include one or more of the plurality of sensors mentioned herein, one or more of the plurality of UI elements mentioned herein, a GPS device, and/or one or more of the plurality of cameras mentioned herein. Thus, the mobile device 302 (or mobile device 140 or 142) can act similarly to vehicle computing system 104 or 204 and can host and run the IDAS app 105 and the RSSS client 106.

The mobile device 302, depending on the embodiment, can be or include a mobile device or the like, e.g., a smartphone, tablet computer, IoT device, smart television, smart watch, glasses or other smart household appliance, in-vehicle information system, wearable smart device, game console, PC, or digital camera, or any combination thereof. As shown, the mobile device 302 can be connected to communications network(s) 122 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the mobile devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the mobile device 302, in accordance with some embodiments of the present disclosure. The mobile device 302 can be communicatively coupled to the network(s) 122 as shown. The mobile device 302 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors (such as sensors) as well as one or more cameras). The other components 316 can include one or more user interfaces (e.g., GUIs, auditory user interfaces, tactile user interfaces, etc.), displays, different types of sensors, tactile (such as sensors), audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The mobile device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of mobile device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 122). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 122).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 302. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 3, the mobile device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, or a camera or any combination thereof that can also be a part of the mobile device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

FIG. 4 illustrates a diagram of an example vehicle 410 configured to implement aspects of impaired driver assistance, in accordance with some embodiments of the present disclosure. As shown in FIG. 4, the vehicle 410 includes a cabin 412 and the cabin includes a driver seat 414a, another front seat 414b, and back seats 414c. The cabin 412 also includes a camera 416 facing the driver seat 414a. The camera 416 has an angle of view 418, which appears to be less than one hundred and eighty degrees in the embodiment shown in FIG. 4. The angle of view 418 allows for the camera 416 to record at least one image or a video of a driver sitting in the driver seat 414a. As shown, the angle of view 418 provides for a field of view including the head 420 of the driver as well as the right shoulder 422b and the left shoulder 422a of the driver. As shown, the camera 416 faces away from the front of the vehicle 410 or the windshield of the vehicle (the windshield is not depicted in FIG. 4).

The camera 416 is shown as being in the cabin 412 of the vehicle 410. However, it is to be understood that such a camera for recording the driver can be located and attached to the vehicle 410 at any part of the vehicle as long as the camera is positioned in a way to capture images or a video recording of the driver in the driver seat 414a. As shown, FIG. 4 depicts a top sectional view of the vehicle 410 below the roof of the body of the vehicle so that the cabin 412 of the vehicle is shown. Also, as shown in FIG. 4, the camera 416 is not a panorama camera configured to record images from a wide horizontal angle; however, in some embodiments, the camera 412 can be a panorama camera. It is to be understood that the angle of view of such a camera for recording image(s) of the driver can be of any degrees as long as the camera's field of view covers a sufficient area to capture behavior of the driver or characteristics of the driver in the driver seat.

Also, it is to be understood that a different number of cameras can be used, and cameras with different or same viewing angles can be used, as well as the viewing fields of the cameras in the horizontal plane may or may not overlap in some embodiments. Also, in some embodiments, the vehicle can include one or more omnidirectional cameras to cover at least a full circle in the horizontal plane relative to the inside of the cabin of the vehicle or to cover a field of view with a full or nearly full sphere inside of the cabin of the vehicle. Such embodiments can be useful for capturing features or behaviors of the driver from other locations in the cabin of the vehicle besides the driver seat.

Figure 5:
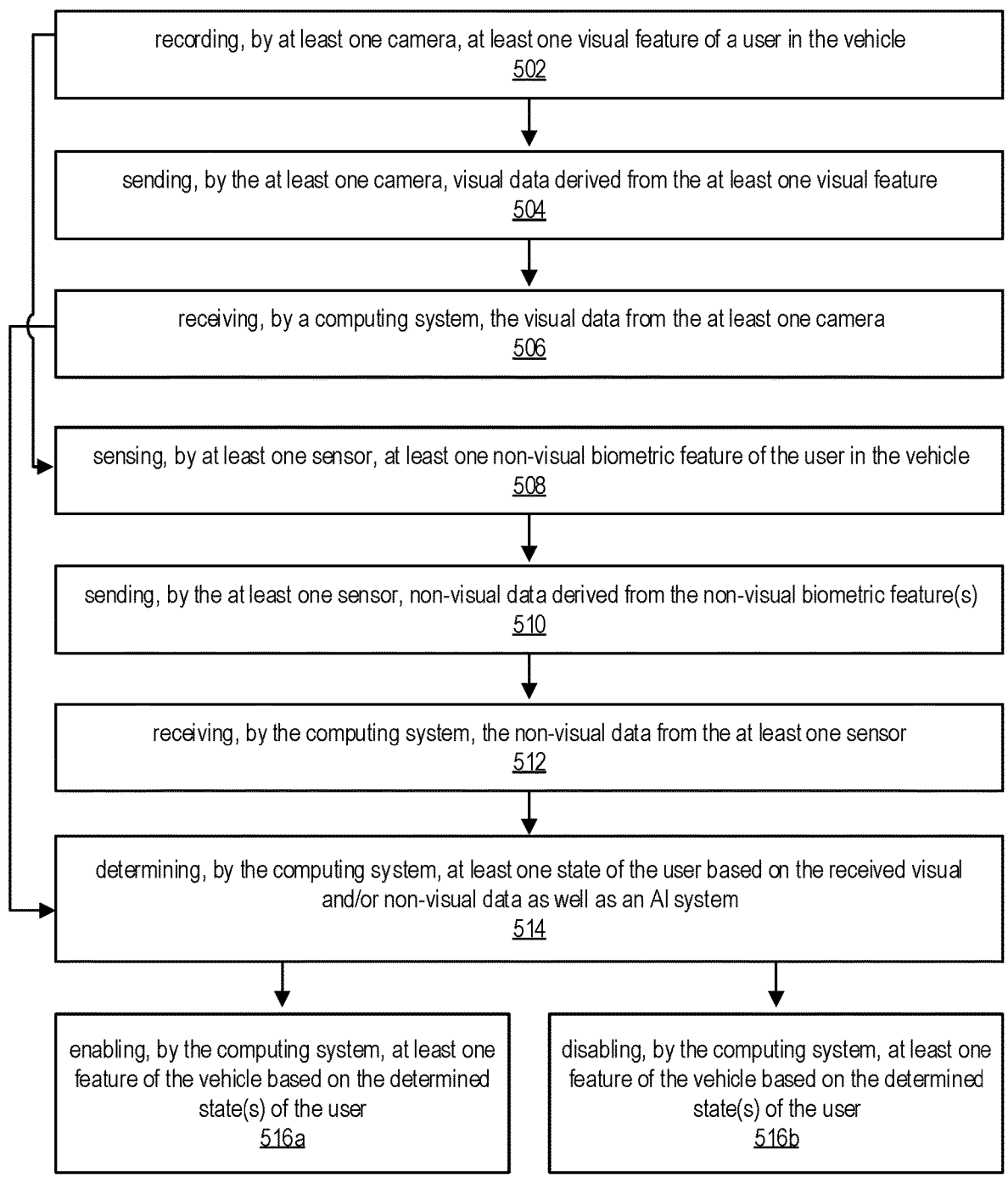
FIGS. 5 to 6 illustrate flow diagrams of example operations that can be performed by aspects of the vehicle shown in FIG. 4 or the networked system depicted in FIGS. 1 to 3, in accordance with some embodiments of the present disclosure.

FIG. 5 illustrates a flow diagram of example operations of method 500 that can be performed by aspects of the vehicle 410 depicted in FIG. 4 as well as aspects of the networked system 100 depicted in FIGS. 1 to 3, in accordance with some embodiments of the present disclosure. For example, the method 500 can be performed by a computing system and/or other parts of any vehicle and/or mobile device depicted in FIGS. 1 to 4.

In FIG. 5, the method 500 begins at step 502 with recording, by at least one camera, at least one visual feature of a user in the vehicle. At step 504, the method 500 continues with sending, by the at least one camera, visual data derived from the at least one visual feature. At step 506, the method 500 continues with receiving, by a computing system, the visual data from the at least one camera. At step 508, the method 500 continues with sensing, by at least one sensor, at least one non-visual feature of the user in the vehicle. At step 510, the method 500 continues with sending, by the at least one sensor, non-visual data derived from the non-visual feature(s). At step 512, the method 500 continues with receiving, by the computing system, the non-visual data from the at least one sensor. At step 514, the method 500 continues with determining, by the computing system, at least one state of the user based on the received visual and/or non-visual data as well as an AI system. At step 516a, the method 500 continues with enabling, by the computing system, at least one feature of the vehicle based on the determined state(s) of the user. At step 516b, the method 500 continues with disabling, by the computing system, at least one feature of the vehicle based on the determined state(s) of the user.

Figure 6:
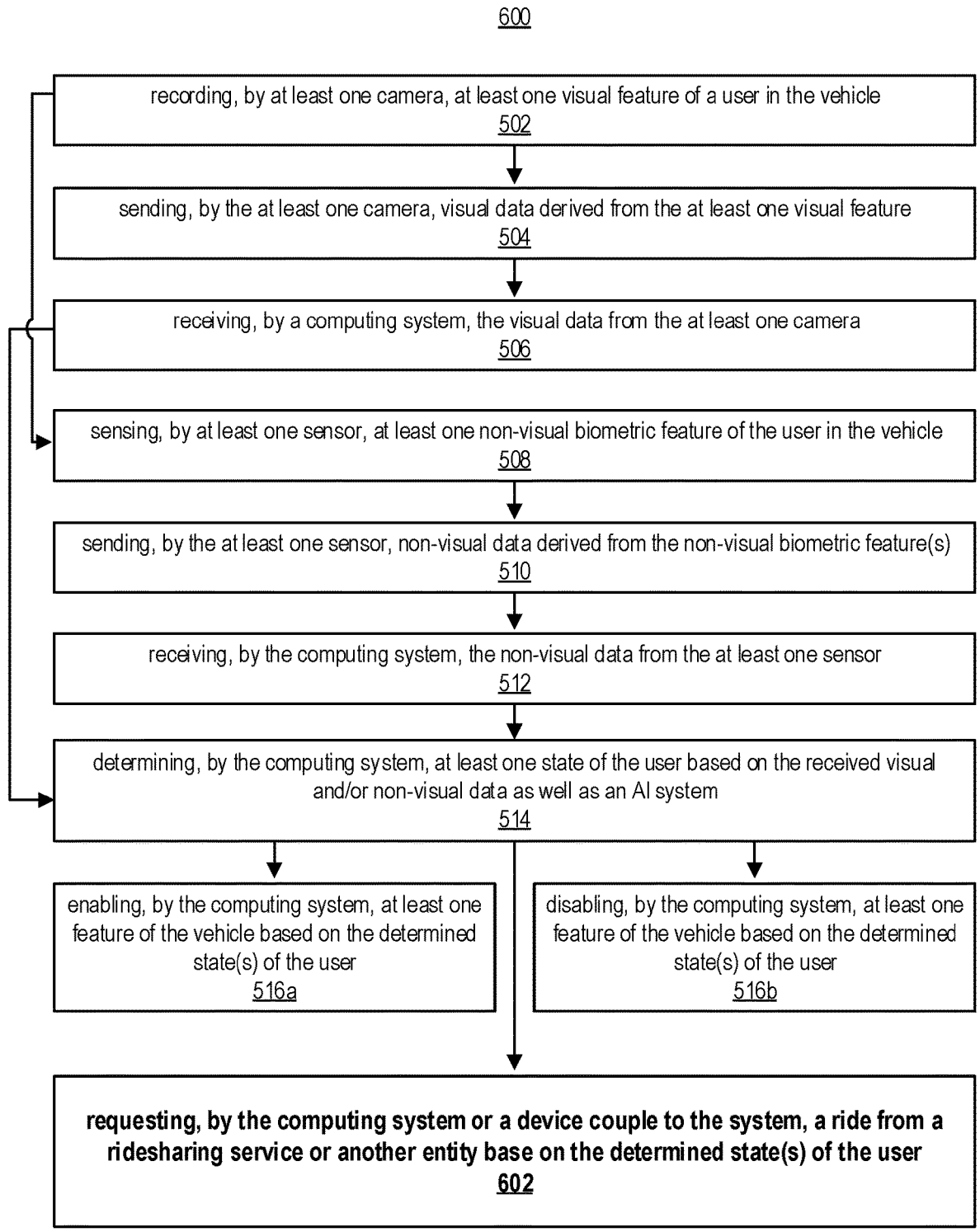

FIG. 6 illustrates a flow diagram of example operations of method 600 that can be performed by aspects of the vehicle 410 depicted in FIG. 4 as well as aspects of the networked system 100 depicted in FIGS. 1 to 3, in accordance with some embodiments of the present disclosure. For example, the method 600 can be performed by a computing system and/or other parts of any vehicle and/or mobile device depicted in FIGS. 1 to 4.

Also, as shown, the method 600 can begin subsequent to at least step 514 of method 500, and step 602 can depend on the occurrence of step 514 of method 500 as well. At step 602, the method 600 continues with requesting, by the computing system or a device couple to the system, a ride from a ridesharing service (such as via the RSSS client 106 and the RSSS server(s) 150) or another entity base on the determined state(s) of the user.

In some embodiments, it is to be understood that the steps of methods 500 and 600 can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that each figure of FIGS. 5 to 6 represents a minimal method within a possibly larger method of a computer system more complex than the ones presented partly in FIGS. 1 to 3. Thus, the steps depicted in each figure of FIGS. 5 to 6 can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
at least one processing device; and
memory containing instructions configured to instruct the at least one processing device to:
receive, from a plurality of cameras, first data derived from at least one visual feature of a user in a vehicle, wherein the at least one visual feature is recorded during a predetermined time period by a first camera in response to the user entering the vehicle, and further derived from at least one visual feature of surroundings of the vehicle recorded by a second camera, and wherein the first camera has a field of view configured to capture features of the user from locations inside the vehicle other than a driver seat;

determine, using a first artificial intelligence (AI) system having an input based on the received first data, at least one state of the user, wherein the first AI system is trained using other data for the user stored in a database during a training period in which the user is previously in the vehicle, wherein input for the training further comprises image data of other users and corresponding states for the other users; and based on the determined at least one state and using a second AI system having the determined state as input:
  order a rideshare for the user,
  enable at least one first function of the vehicle, and
  disable at least one second function of the vehicle, including locking or positioning the driver seat to indicate to the user that the user should not be driving;

wherein the instructions are further configured to instruct the at least one processing device to train the first AI system after a predetermined number of identifications of the user as a driver of the vehicle.

2. The system of claim 1, wherein the at least one state is determined further using a third AI system.

3. The system of claim 2, wherein the first AI system comprises at least one of an artificial neural network or a decision tree.

4. The system of claim 1, wherein the user is a driver of the vehicle, and the determining the at least one state comprises determining that a risk score of the user is above a threshold.

5. The system of claim 1, wherein enabling the at least one first function includes taking control of a drivetrain from the user by enabling an autonomous driving mode.

6. The system of claim 1, wherein disabling the at least one second function further includes disabling a drivetrain prior to driving the vehicle from a parked state.

7. The system of claim 1, wherein the at least one state comprises an impaired driver state.

8. The system of claim 7, wherein the ordering the rideshare comprises determining a destination for the user based on an inference from a pattern of trips made using the vehicle.

9. The system of claim 8, wherein:
the determining the destination is performed using a third AI system comprising at least one of an artificial neural network or a decision tree; and
an input for the third AI system comprises the pattern of trips.

10. The system of claim 1, further comprising:
at least one sensor configured to record at least one non-visual feature of the user, and derive second data from the at least one non-visual feature;
wherein the input for the first AI system is further based on the second data.

11. A system comprising:
a first camera configured to record at least one first visual feature of a user in a vehicle, and provide first data derived from the first visual feature, wherein the first camera is configured to record the first visual feature during a predetermined time period in response to the user entering the vehicle, and wherein the first camera has a field of view configured to capture features of the user from locations inside the vehicle other than a driver seat;
a second camera configured to record at least one second visual feature of surroundings of the vehicle; and
a computing system configured to:
  receive, from the first and second cameras, first data derived from the first and second visual features;
  determine at least one state of the user using a first artificial intelligence (AI) system having an input based on the first data, wherein the first AI system is trained using other data for the user stored in a database during a training period in which the user is previously in the vehicle, wherein input for the training further comprises image data of other users and corresponding states for the other users; and
  based on the determined at least one state and using a second AI system having the determined state as input:
    order a rideshare for the user,
    enable at least one first function of the vehicle, and
    disable at least one second function of the vehicle, including locking or positioning the driver seat to indicate to the user that the user should not be driving;
  wherein the first AI system is trained after a predetermined number of identifications of the user as a driver of the vehicle.

12. The system of claim 11, wherein the first AI system comprises at least one of an artificial neural network or a decision tree.

13. The system of claim 11, wherein enabling the first function includes enabling an autonomous driving mode.

14. The system of claim 11, wherein disabling the second function further includes disabling a drivetrain of the vehicle when the vehicle is in a parked state.

15. The system of claim 11, wherein the ordering the rideshare comprises determining a destination for the user based on a pattern of prior trips for the vehicle.

16. The system of claim 15, wherein the determining the destination is further based on a third AI system having an input based on the pattern of prior trips.

17. The system of claim 11, further comprising:
at least one sensor configured to record at least one non-visual feature of the user, and provide second data based on the at least one non-visual feature;
wherein the input for the first AI system is further based on the second data.

18. A method comprising:
receiving, by a computing system from a plurality of cameras, first data derived from at least one visual feature of a user in a vehicle, wherein the at least one visual feature is recorded during a predetermined time period by a first camera in response to the user entering the vehicle, and further derived from at least one visual feature of surroundings of the vehicle recorded by a second camera, and wherein the first camera has a field of view configured to capture features of the user from locations inside the vehicle other than a driver seat;
determining using a first artificial intelligence (AI) system having an input based on the received first data, a state of the user, wherein the first AI system is trained using the first data, second data representative of information derived from non-visual features for the user stored in a database during a training period in which the user is identified as a driver of the vehicle, and third data comprising of image data of other users and corresponding states for the other users; and based on the determined at least one state and using a second AI system having the determined state as input:
ordering a rideshare for the user,
enabling at least one first function of the vehicle, and
disabling at least one second function of the vehicle, including locking or positioning the driver seat to indicate to the user that the user should not be driving;

wherein the AI system is trained after a predetermined number of identifications of the user as a driver of the vehicle.

* * * * *